US012466187B2

(12) United States Patent
Araishi

(10) Patent No.: US 12,466,187 B2
(45) Date of Patent: Nov. 11, 2025

(54) INK SUPPLY DEVICE AND IMAGE FORMING SYSTEM

(71) Applicant: KYOCERA Document Solutions Inc., Osaka (JP)

(72) Inventor: Kuniaki Araishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 188 days.

(21) Appl. No.: 18/361,577

(22) Filed: Jul. 28, 2023

(65) Prior Publication Data

US 2024/0042766 A1 Feb. 8, 2024

(30) Foreign Application Priority Data

Aug. 2, 2022 (JP) ................................ 2022-123489

(51) Int. Cl.
*B41J 2/17* (2006.01)

(52) U.S. Cl.
CPC ........... *B41J 2/1721* (2013.01); *B41J 2/1742* (2024.05)

(58) Field of Classification Search
CPC ........ B41J 2/1721; B41J 2/1742; B41J 2/175; B41J 2/17509; B41J 2/17566; B41J 29/13; B41J 2/01; B41J 29/393
See application file for complete search history.

(56) References Cited

U.S. PATENT DOCUMENTS 7,726,773 B2 6/2010 Nakamura et al.
2023/0150286 A1* 5/2023 Tojo ........................ B41J 29/393 347/5
2023/0311541 A1* 10/2023 Iwata ...................... B41J 11/007 347/31

FOREIGN PATENT DOCUMENTS

JP 2006-175747 A 7/2006

* cited by examiner

*Primary Examiner* — Justin Seo
(74) *Attorney, Agent, or Firm* — Studebaker Brackett PLLC

(57) ABSTRACT

An ink supply device according to the present disclosure includes an attachment part and a drip tray. To the attachment part, an ink pack is attached. The drip tray is provided below the attachment part and has a capacity equal to or larger than a capacity of one ink pack.

3 Claims, 11 Drawing Sheets

INK SUPPLY DEVICE AND IMAGE FORMING SYSTEM

INCORPORATION BY REFERENCE

This application is based on and claims the benefit of priority from Japanese patent application No. 2022-123489 filed on Aug. 2, 2022, which is incorporated by reference in its entirety.

BACKGROUND

The disclosure relates to an ink supply device which supplies an ink and an image forming system including the ink supply device.

In an inkjet recording apparatus, an ink may leak from a connection portion between pipes. In addition, waste liquid is generated by cleaning the inkjet head. Therefore, technology to recover liquid from the inkjet recording apparatus has been studied. For example, there is a waste liquid recovery device which is disposed outside a liquid ejection mechanism and includes a waste liquid tank including a connection port that can be connected to the discharge side of the suction pump for pumping the liquid from the nozzle of the injection head of the liquid ejection mechanism.

An ink supply device which supplies the ink to the inkjet recording apparatus includes a large-capacity ink pack. Since the ink pack is made of flexible material, a large amount of ink may leak if it is damaged. Since the waste liquid recovery device described above is configured to suck the ink from the nozzle of the inkjet head, it cannot be applied to the recovery of the ink leaked from the ink pack.

SUMMARY

An ink supply device according to the present disclosure includes an attachment part and a drip tray. To the attachment part, an ink pack is attached. The drip tray is provided below the attachment part and has a capacity equal to or larger than a capacity of one ink pack.

An image forming system according to the present disclosure includes the ink supply device, a detection part and a control part. The detection part detects the ink dropped on the drip tray. The control part executes a predetermined processing when the detection part detects the ink.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, an ink supply device 140 and an image forming system 100 according to the embodiment of the present disclosure will be described.

Figure 1:
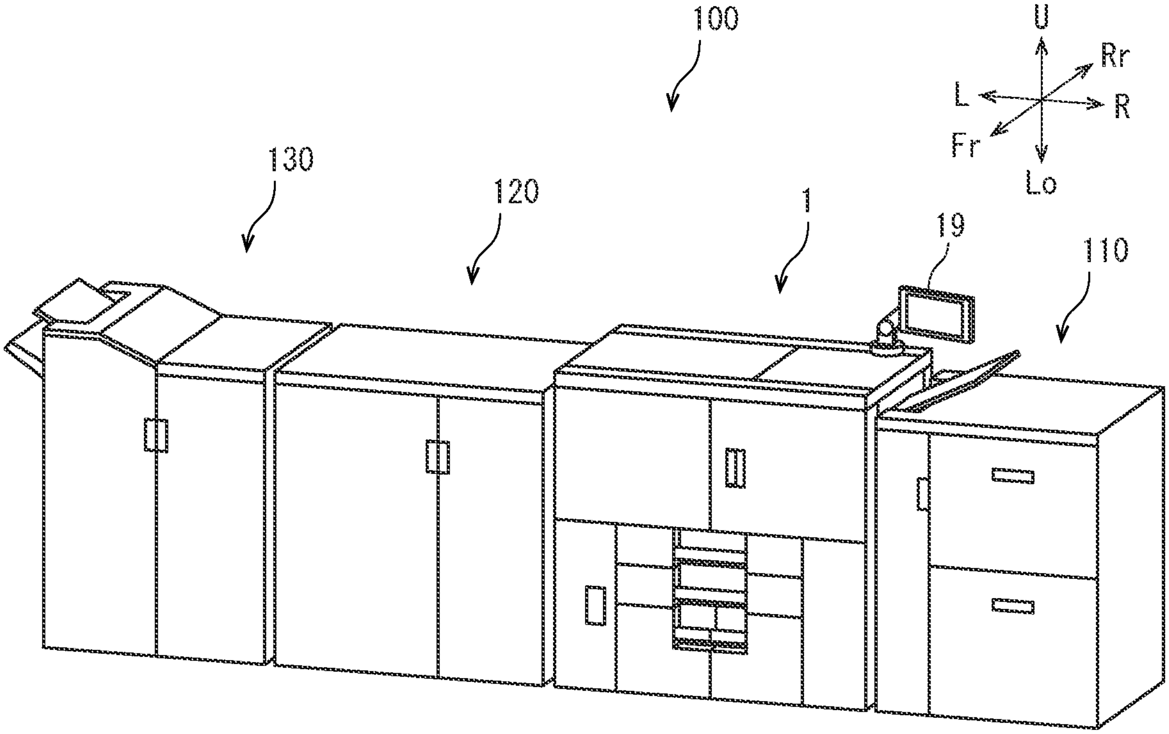
FIG. 1 is a perspective view showing an appearance of an image forming system according to one embodiment of the present disclosure.
Figure 2:
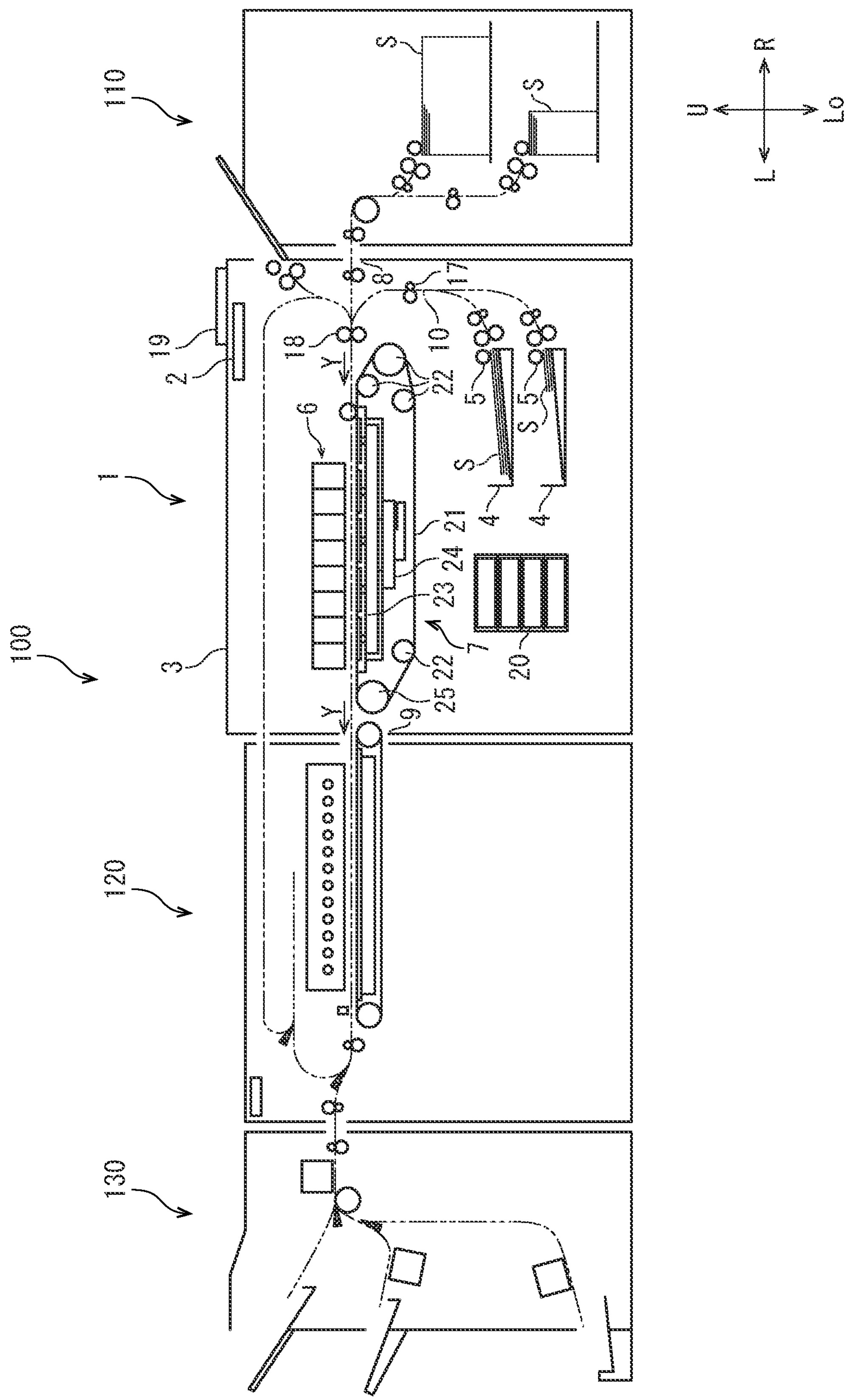
FIG. 2 is a front view schematically showing an inner structure of the image forming system according to the embodiment of the present disclosure.
Figure 3:
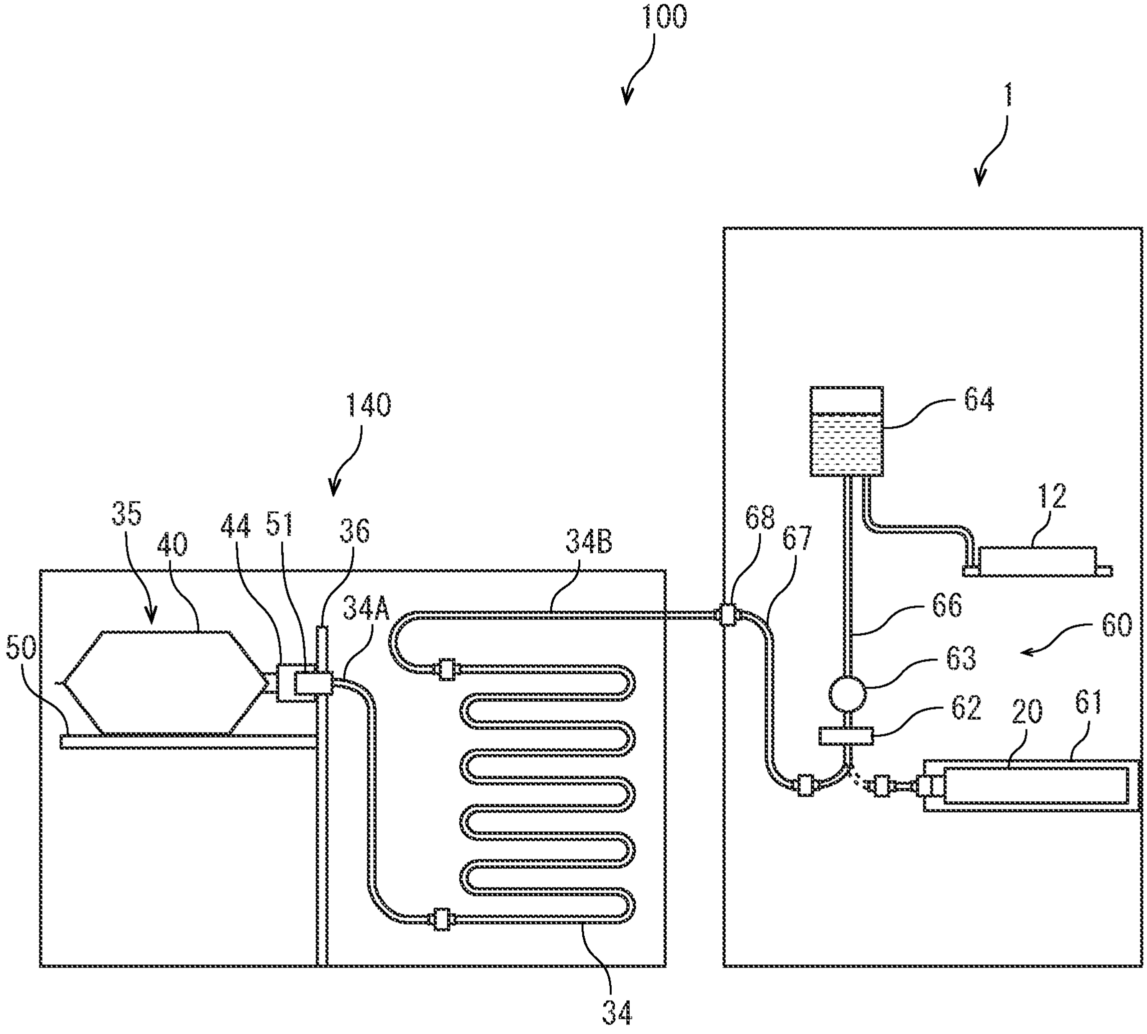
FIG. 3 is a view schematically showing an ink supply path according to the embodiment of the present disclosure.

First, the entire structure of an image forming system 100 will be described. FIG. 1 is a perspective view showing the appearance of the image forming system 100. FIG. 2 is a front view schematically showing the inside of the image forming system 100. FIG. 3 is a view schematically showing an ink supply path 60. Hereafter, the front side of the paper plan on which FIG. 1 is drawn is defined as a front side of the image forming system 100, and the left-and-right direction is defined based on a case where the image forming system 100 is viewed from the front side. In each figure, U, Lo, L, R, Fr and Rr indicate the upper, lower, left, right, front and rear, respectively.

The image forming system 100 (see FIG. 1 and FIG. 2) includes a sheet feeding device 110, an inkjet recording device 1, a drying device 120, and a post-processing device 130. The sheet feeding device 110 includes large-capacity sheet feeding decks that can accommodate thousands of sheets S, and supplies the sheets S to the inkjet recording device 1. The inkjet recording device 1 forms an image on the sheet S by an inkjet method. The drying device 120 heats and dries the ink ejected on the sheet S. The post-processing device 130 performs post-processing, such as punching, stapling and folding, on the sheet S.

The inkjet recording device 1 includes a box-shaped body housing 3. In the lower portion of the body housing 3, sheet feeding cassettes 4 in which the sheets such as a plain paper and a coated paper are stored, and sheet feeding rollers 5 which feed the sheet S from the sheet feeding cassettes 4 are provided. Above the sheet feeding cassettes 4, a conveyance unit 7 is provided, which attracts the sheet S and conveys it in the Y direction. Above the conveyance unit 7, an image forming unit 6 is provided, which ejects an ink and forms an image. In the upper right portion in the main body housing 3, a discharge roller 8 which discharges the image-formed sheet S is formed and a discharge tray 9 on which the discharged sheets S are stacked are provided.

Inside the body housing 3, a conveyance path 10 is provided from the sheet feeding roller 5 through a gap between the conveyance unit 7 and the image forming unit 6 to the discharge roller 8. The conveyance path 10 is formed mainly by plate-like members facing each other with a gap for passing the sheet S. On the conveyance path 10, a conveyance roller 17 for holding and conveying the sheet S is provided at multiple positions in the conveyance direction Y. A registration roller 18 is provided upstream of the image forming unit 6 in the conveyance direction Y.

The conveyance unit 7 includes an endless conveyance belt 21, a support plate 23, and a suction part 24. The conveyance belt 21 has a number of vent holes (not shown), and is wound around a drive roller 25 and a driven roller 22. The support plate 23 has a number of vent holes, and the upper surface is in contact with the inner surface of the conveyance belt 21. The suction part 24 attracts the sheet S to the conveyance belt 21 by sucking air through the vent holes of the support plate 23 and the vent holes of the conveyance belt 21. When the drive roller 25 is driven in the counterclockwise direction by a drive unit (not shown) including a motor and a reduction gear, the conveyance belt 21 is traveled in the counterclockwise direction, and the sheet S attracted by the conveyance belt 21 is conveyed in the Y direction.

The inkjet recording device 1 includes an ink supply path 60 (see FIG. 3). Since four colors of the ink are used in this embodiment, four ink supply paths 60 are provided, but in the figure, the ink supply path 60 corresponding to one color of the ink is shown. The inkjet recording device 1 includes a container attachment part 61 to which an ink container 20 is attached, a filter which filters the ink, a pump 63 which pumps the ink from the ink container 20 through the filter 62, and a sub-tank 64 in which the ink fed from the pump 63 is stored.

The image forming unit 6 includes head units 11Y, 11Bk, 11C and 11M (collectively referred to as the head unit 11) and ejects the yellow, black, cyan and magenta ink, respectively. The ink containers 20Y, 20Bk, 20C and 20M (collectively referred to as the ink container 20) filled with the yellow, black, cyan and magenta ink are connected to the head units 11Y, 11Bk, 11C and 11M, respectively.

The head unit 11 includes one or more inkjet heads 12, for example, three inkjet heads 12 arranged in a staggered manner. The inkjet head 12 includes a parallelepiped housing whose longitudinal direction is along the front-and-rear direction, and a nozzle plate provided at the bottom of the housing (not shown). The nozzle plate has a number of nozzles lined up in the front-and-rear direction. The nozzle has a branched flow path branching from a flow path connected to the sub-tank 64 and an ejection port provided on the nozzle surface. A vibration plate forms a part of the inner wall of the branched flow path. The vibration plate includes a pressurizing element. In the housing, a driver to drive the pressurizing element and a control circuit to control the driver are provided. As the pressurizing element, a piezoelectric element, an electrostatic element (electrostatic actuator), a heating element (used in thermal inkjet systems) or the like are used.

The control part 2 includes an arithmetic part and a storage part (not shown). The arithmetic part is, for example, a CPU (Central Processing Unit). The storage part includes a storage media such as a ROM (Read Only Memory), a RAM (Random Access Memory) and a EEPROM (Electrically Erasable Programmable Read Only Memory). The arithmetic part performs various processes by reading and executing the control program stored in the storage part. The control part 2 may be realized by an integrated circuit without using software.

A display operation part 19 is provided on the upper portion of the body housing 3. The display operation part 19 includes a display panel, a touch panel provided superimposed on the display surface of the display panel, and a keypad (not shown). The control part 2 displays a screen showing the operation menu, status or the others of the inkjet recording device 1 on the display panel, and controls each part of the inkjet recording device 1 according to the operation detected by the touch panel and the keypad.

The basic image forming operation of the inkjet recording device 1 is as follows. When an image forming job is input to the inkjet recording device 1 from the display operation part 19 or an external computer, the sheet feeding roller 5 feeds the sheet S from the sheet feeding cassette 4 to the conveyance path 10, and the registration roller 18, whose rotation has been stopped, corrects the skew of the sheet S. When the registration roller 18 feeds the sheet S to the conveyance unit 7 at a predetermined timing, the conveyance unit 7 attracts the sheet S to the conveyance belt 21 and conveys it in the Y direction. When the control part 2 supplies raster-type image data to the control circuit in synchronization with the conveyance of the sheet S, the driver supplies an ejection signal corresponding to the gradation data to the pressurizing element, and the ink is ejected from the nozzle to form an image on the sheet S. The discharge roller 8 discharges the image-formed sheet S to the discharge tray 9.

Figure 4:
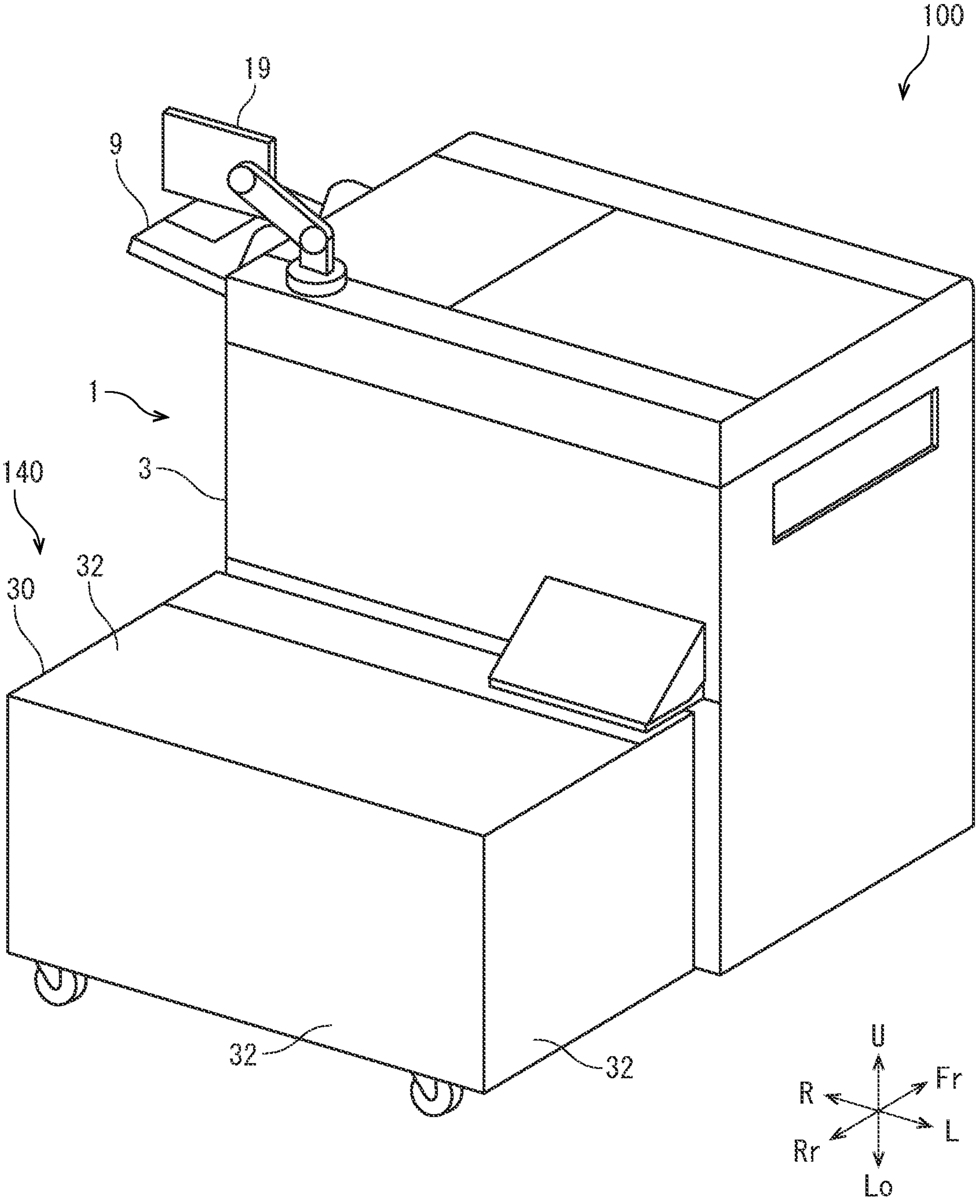
FIG. 4 is a perspective view showing an appearance of an ink supply device according to one embodiment of the present disclosure.
Figure 5:
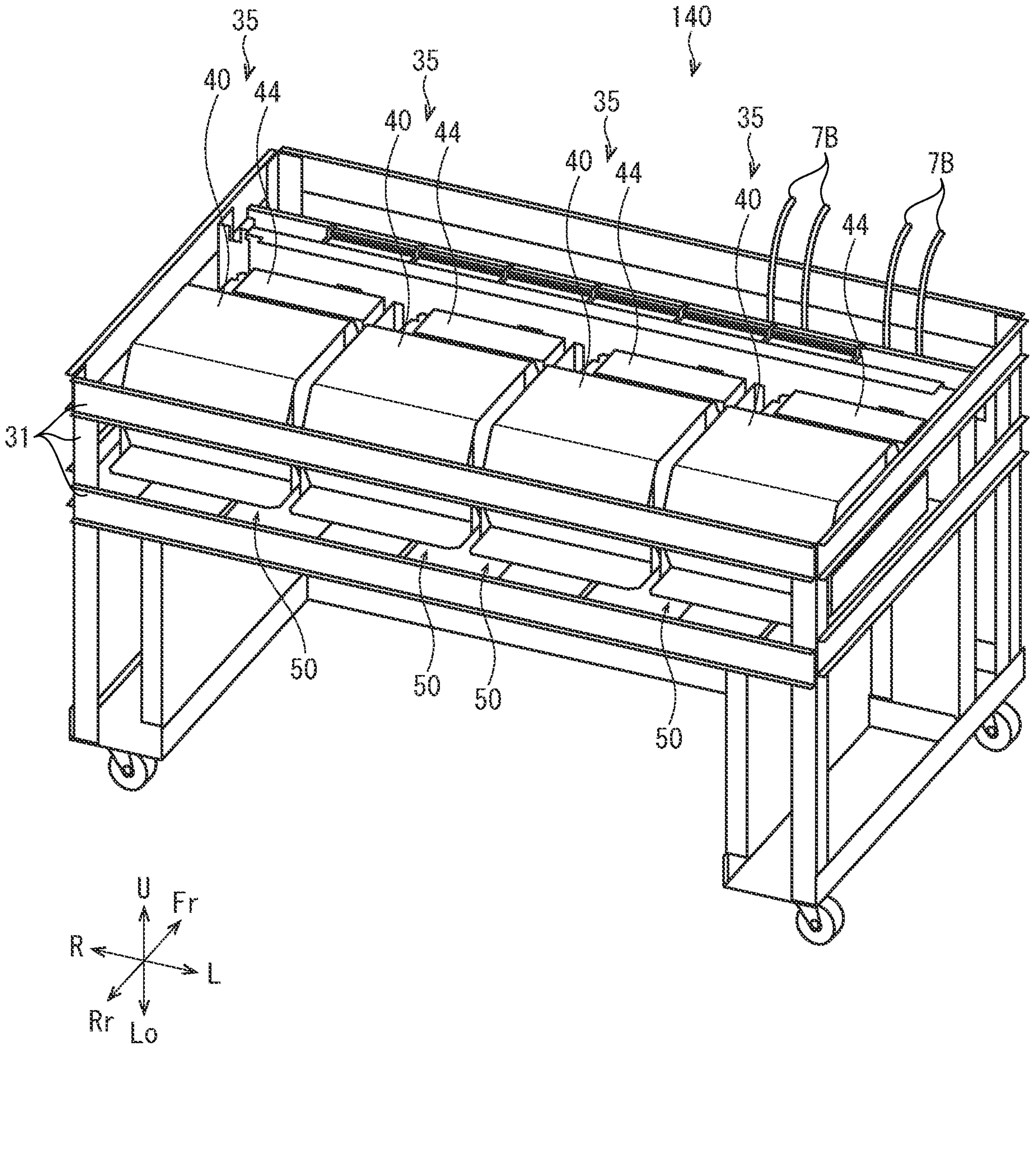
FIG. 5 is a perspective view showing in inner structure of the ink supply device according to the embodiment of the present disclosure.

[Ink Supply Device] Next, the configuration of the ink supply device 140 will be described (see FIG. 3 to FIG. 5). FIG. 4 is a perspective view showing the appearance of the ink supply device 140. FIG. 5 is a perspective view showing the inside of the ink supply device 140. The ink supply device 140 includes a housing 30, four attachment parts 50, and four ink packs 35.

The housing 30 has a frame 31 (see FIG. 5) in which metal columns, beams and the like are assembled in a rectangular box shape, and an exterior plate 32 (see FIG. 4) forming the side and upper surfaces of the housing 30. The four attachment parts 50 are arranged in the left-and-right direction in the upper portion in the housing 30. The attachment parts 50 are supported by the frame 31.

A tube 34 (see FIG. 3) is, for example, a stainless steel tube, and formed in a regularly meandered shape. The ink supply device 140 includes a heater (not shown) to heat the ink passing through the tube 34. One end of the tube 34 is connected to the ink pack 35 via an upstream connection tube 34A. The other end of the tube 34 is connected to a coupling 68 of the inkjet recording device 1 via a downstream connection tube 34B.

Figure 6:
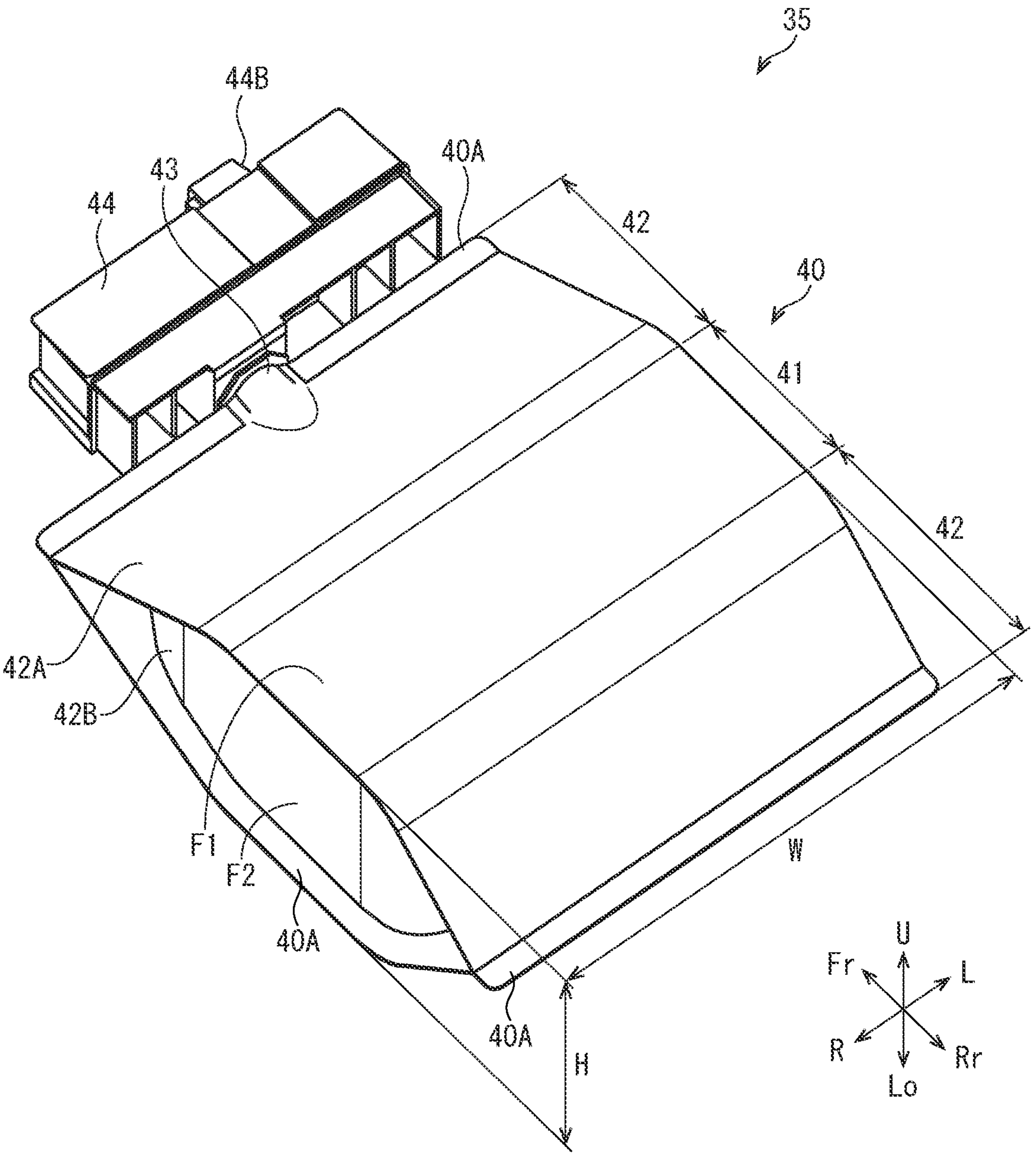
FIG. 6 is a perspective view showing an ink pack according to the embodiment of the present disclosure.
Figure 7:
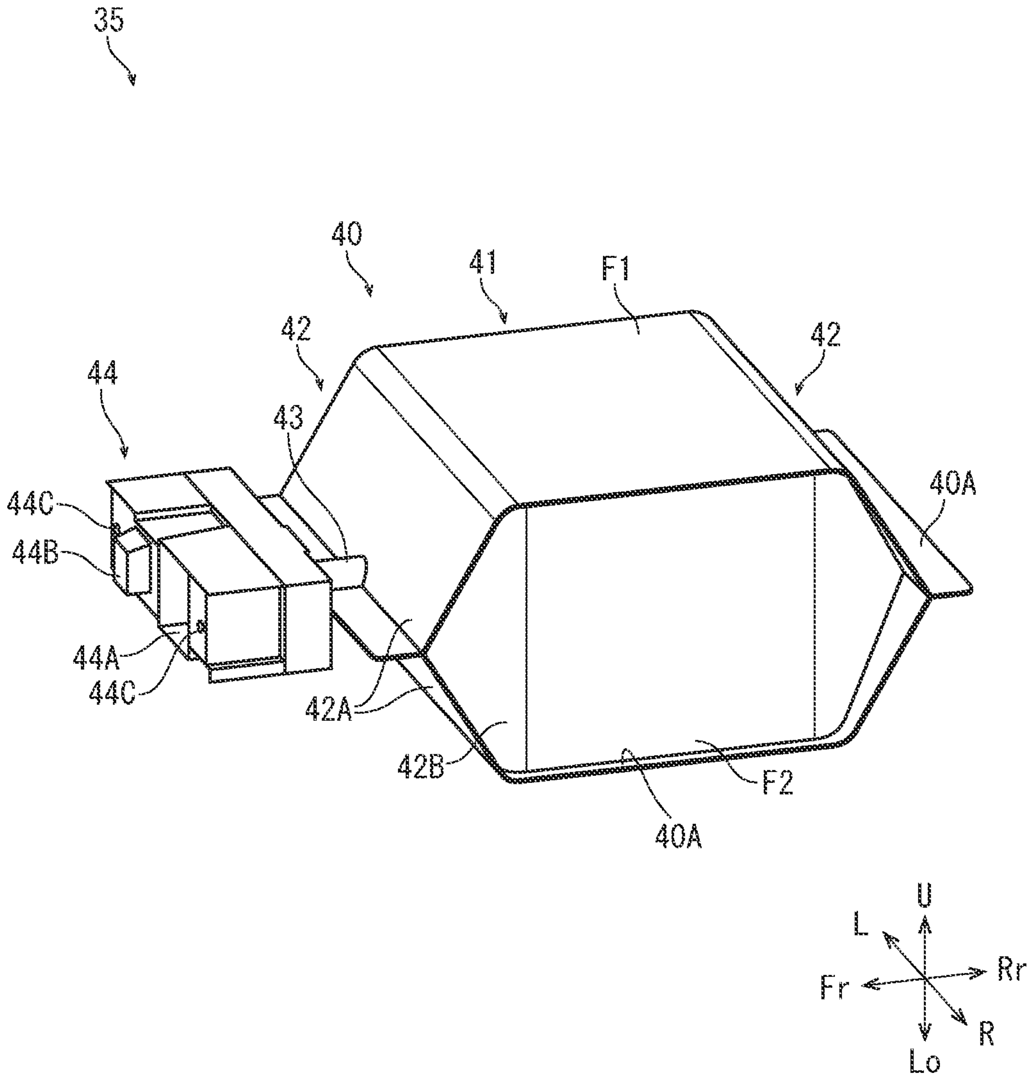
FIG. 7 is a perspective view showing the ink pack according to the embodiment of the present disclosure.

[Ink Pack] FIG. 6 and FIG. 7 are perspective views showing the ink pack 35. The ink pack 35 has a pack body 40, a spout 43, and a pack connection part 44.

[Pack Body] The pack body 40 is formed into a bag shape by joining flexible films F1 and F2. The films F1 and F2 forming the pack body 40 are laminated films in which multiple layers are laminated. For example, the films F1 and F2 each has a four-layer structure in which layers of polyethylene, aluminum, polyamide (nylon) and polyethylene terephthalate are laminated sequentially from the inner layer to the outer layer. The films F1 and F2 are not limited to the above structures, as long as they are flexible materials that can block light, air (odor), moisture and the like.

The pack body 40 is formed by joining the upper and lower films F1 formed in a rectangular shape and the left and right films F2 formed in a hexagonal shape along their outer circumferential edges to be formed in a bag with a gusset. Around the outer circumferential edge of the pack body 40, a belt-shaped joined part 40A is formed in which the films F1 and F2 are overlapped and joined. The films F1 and F2 are preferably joined by heat melting and pressure-joining, but the method for joining the films is not limited to this, and they may be joined using an adhesive or double-sided tape.

The pack body 40 has a torso part 41 that forms a square cylindrical shape when the ink is contained, and a pair of sealing parts 42 that seal both ends of the torso part 41 in the axial direction of the torso part 41 (the front-and-rear direction). The sealing part 42 is formed in a gable roof shape having a pair of flat parts 42A facing each other in the thickness direction (the upper-and-lower direction) and a pair of gable parts 42B facing each other in the width direction (the direction perpendicular to the axial and thickness directions (the left-and-right direction)). In this specification, "facing" means not only facing each other in a parallel posture but also facing each other in an inclined posture (non-parallel posture).

In a state where the pack body 40 is fully filled with the ink (a full state), the flat parts 42A are inclined so as to be closer each other as separated away from the torso part 41 in the axial direction. The flat parts 42A are joined at the tip end side in the axial direction to form a joined part 40A. In addition, the gable part 42B is formed into a triangular shape so as to be thinner as separated away from the torso part 41 in the axial direction. In the full state, the pack body 40 is formed such that the maximum dimension W (or it may be considered as the width dimension of the torso part 41) in the width direction of the flat part 42A is longer than the maximum dimension H (or it may be considered as the thickness of the torso part 41) in the thickness direction of the gable part 42B.

[Spout] The pack body 40 has the spout 43 through which the contained ink is discharged. The spout 43 is made of, for example, synthetic resin, and formed in a cylindrical shape. The spout 43 is mounted approximately in the center portion in the width direction at the tip end (front end) of one (front) sealing part 42. The spout 43 is fixed to the joined part 40A while being held between the flat parts 42A. That is, the flat parts 42A are also joined to the outer circumferential surface of the spout 43.

[Pack Connection Part] The pack connection part 44 is attached to the tip end portion of the spout 43. The pack connection part 44 is made of hard synthetic resin, for example, and is formed into a parallelepiped shape long in the left-and-right direction. The pack connection part 44 is formed such that its length in the width direction is shorter than the maximum dimension W in the width direction of the flat part 42A and longer than a half of the maximum dimension W. The pack connection part 44 is formed such that its thickness (height) is shorter than the thickness (H) of the torso part 41. The spout 43 is mounted at a position shifted from the center of the pack connection part 44 in the width direction to the right side. That is, the pack connection part 44 is arranged in a position shifted to the left side with respect to the pack body 40 (the sealing part 42).

The pack connection part 44 (see FIG. 7) has a supply port 44A, a convex part 44B, and hole parts 44C. The supply port 44A is provided in front of the spout 43 and communicates with the spout 43. The convex part 44B is provided on the left side of the supply port 44A. The hole parts 44C are provided on the right side of the supply port 44A and on the left side of the convex part 44B.

Figure 8:
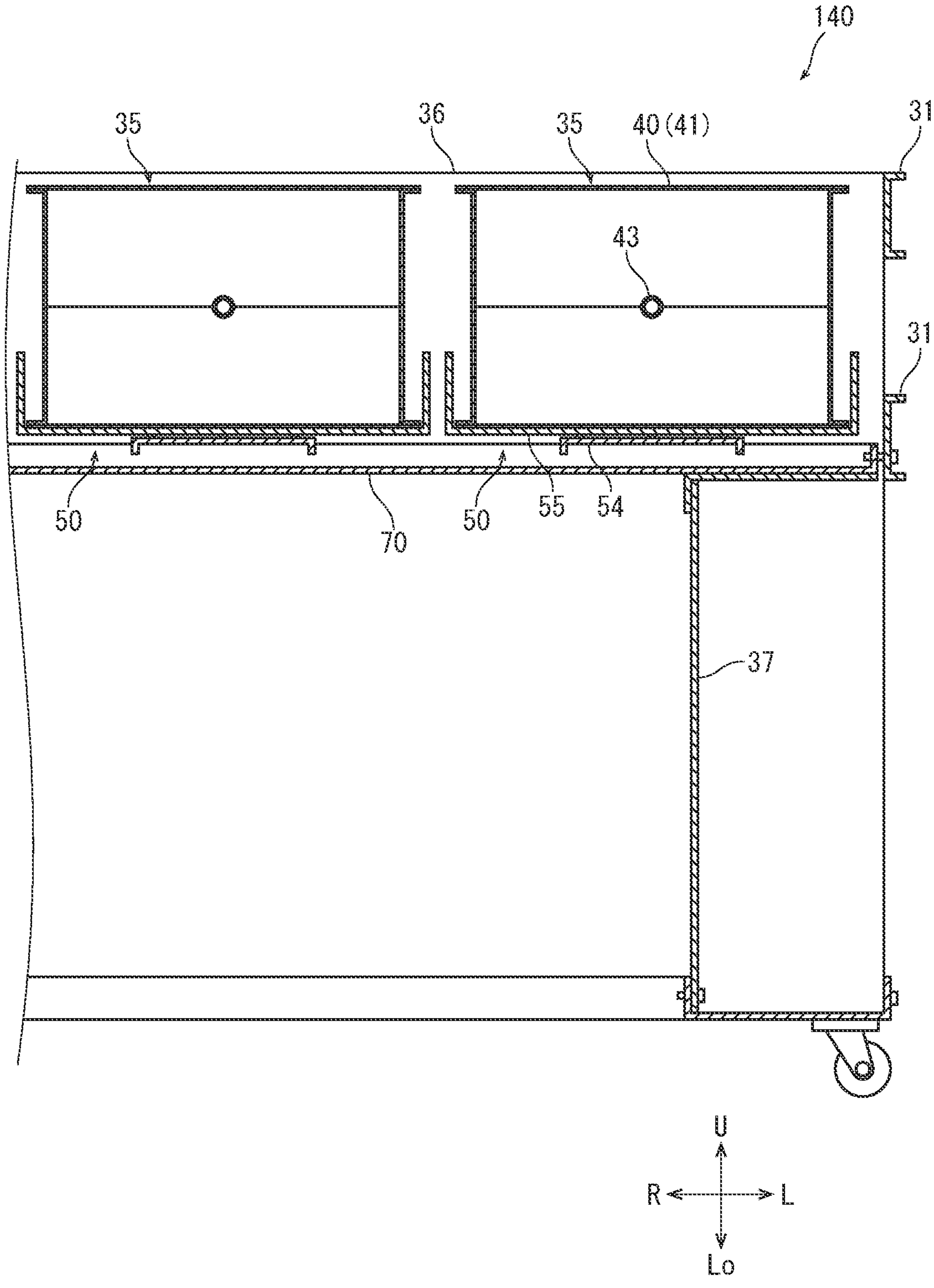
FIG. 8 is a sectional view showing an attachment part according to the embodiment of the present disclosure.
Figure 9:
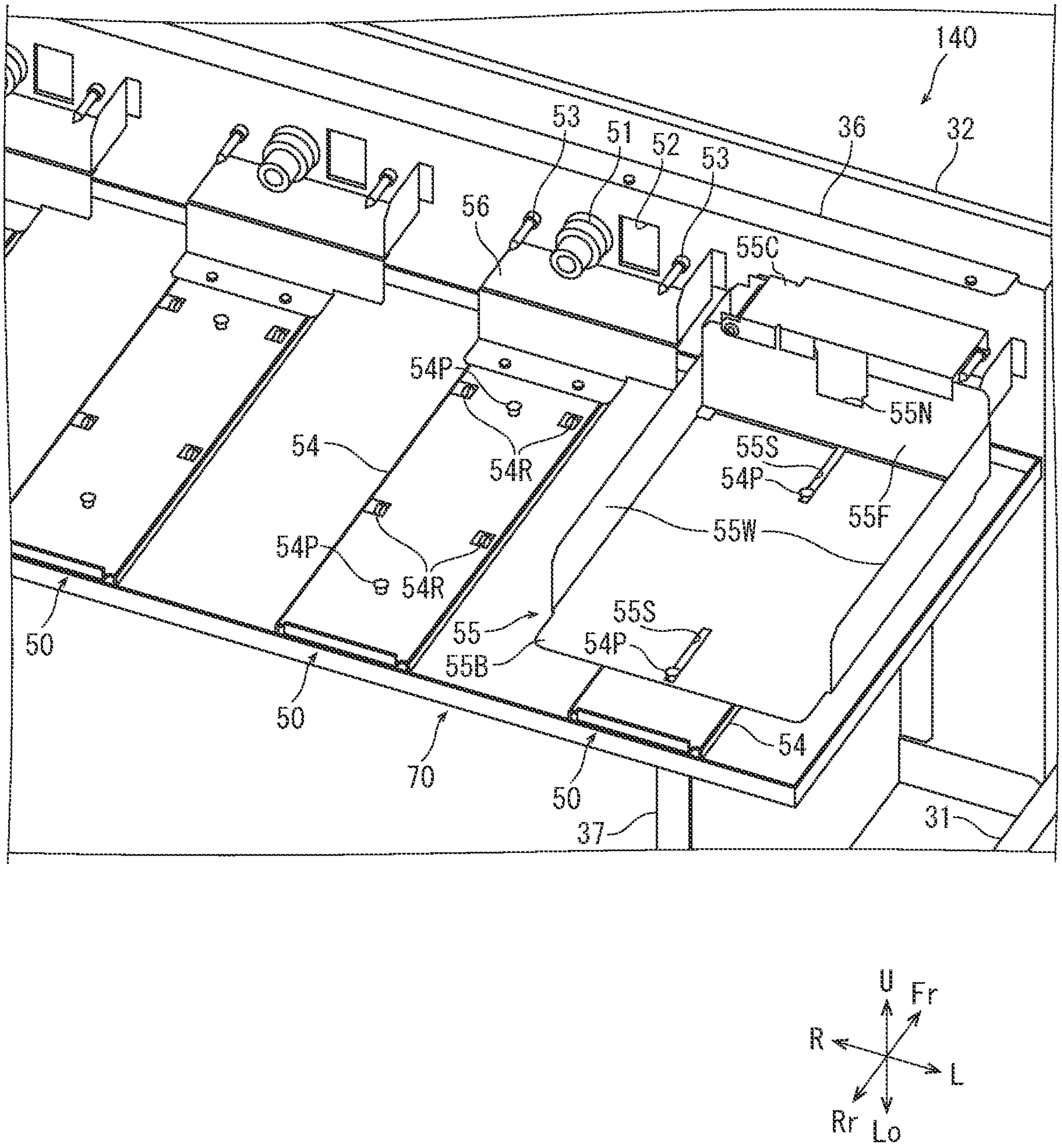
FIG. 9 is a perspective view showing the attachment part according to the embodiment of the present disclosure.

[Attachment Part] FIG. 8 is a sectional view showing the configuration of the attachment part 50. FIG. 9 is a perspective view showing the configuration of the attachment part 50. In FIG. 9, a left rear column frame 31 and a rear and left beam frames 31 are not shown. The attachment part 50 includes four suction ports 51, four carriage support parts 54, and four carriages 55.

[Suction Port] Behind the front exterior plate 32 of the housing 30, an inner wall 36 parallel to the front exterior plate 32 is provided. In front of the inner wall 36, left and right inner walls 37 perpendicular to the inner wall 36 is provided. FIG. 8 and FIG. 9 shows only the left inner wall 37.

In the inner wall 36, the suction ports 51, hole parts 52 and pins 53 are provided. The suction port 51 is provided at four positions approximately equally spaced in the left-and-right direction on the upper portion of the inner wall 36. The suction port 51 is connected to the upstream connection tube 34A. The supply port 44A of the pack connection part 44 of the ink pack 35 is connected to the suction port 51. The hole part 52 is provided on the left side of the suction port 51. The convex part 44B of the pack connection part 44 is inserted into the hole part 52. The pins 53 are provided on the right side of the suction port 51 and on the left side of the hole part 52. The pin 53 is inserted into the hole 44C of the pack connection part 44.

[Carriage Support Part] The carriage support part 54 is provided in front of each of the four suction ports 51. The carriage support part 54 is a rectangular plate-like member whose longitudinal direction is along the front-and-rear direction. The front end portion of the carriage support part 54 is supported by the inner wall 36 through a support member 56 formed in a stepped manner. The rear end portion of the carriage support part 54 is supported by the lower frame 31 of the two rear beam-shaped frames 31 shown in FIG. 5. A left and right rollers 54R is provided at two positions in the front-and-rear direction of the carriage support part 54. The roller 54R is rotatable around an axis whose axial direction is along the left-and-right direction. A sliding pins 54P protruding upward is provided at two positions in the front-and-rear direction of the carriage support part 54.

[Carriage] The carriage 55 is provided above each of the four carriage support parts 54. In FIG. 9, only the leftmost carriage 55 of the four carriages 55 is shown. The carriage 55 has a bottom part 55B facing the carriage support part 54, side wall parts 55W provided along both the left and right end portions of the bottom part 55B, and a front wall 55F provided along the front and portion of the bottom part 55B.

The lower surface of the bottom part 55B comes into contact with the rollers 54R of the carriage support part 54. The bottom part 55B has a slit 55S at the front and rear positions along the front-and-rear direction. Inside the slits 55S, the sliding pins 54P of the carriage support part 54 are disposed. The slits 55S and the slide pins 54P guide the carriage 55 in the front-and-rear direction. The carriage 55 is slidable in the front-and-rear direction within the length of the slit 55S.

The front wall 55F has a notch 55N into which the spout 43 of the ink pack 35 is inserted. The front wall 55F has a cover 55C covering the upper portion of the pack connection part 44. The right end portion of the cover 55C is coupled to the front wall 55F via a hinge whose axial direction is along the front-and-rear direction.

The ink pack 35 is installed according to the following procedure. After the carriage 55 is moved rearward, the cover 55C is opened and then the ink pack 35 is placed on the carriage 55 while positioning the spout 43 to the notch 55N. With this work, the supply port 44A of the pack connection part 44 faces the suction port 51 of the attachment part 50 in the front-and-rear direction. Also, the convex part 44B of the pack connection part 44 faces the hole part 52 of the attachment part 50, and the hole parts 44C of the pack connection part 44 face the pins 53 of the attachment part 50. When the carriage 55 is moved forward, the convex part 44B is inserted into the hole part 52, the pins 53 are inserted into the hole parts 44C, and the supply port 44A is connected to the suction port 51. Thus, the ink pack 35 is connected to the piping 67 (see FIG. 3) of the inkjet recording device 1 via the tube 34 and the others, and the ink filled in the ink pack 35 can be supplied to the inkjet recording device 1.

Figure 10:
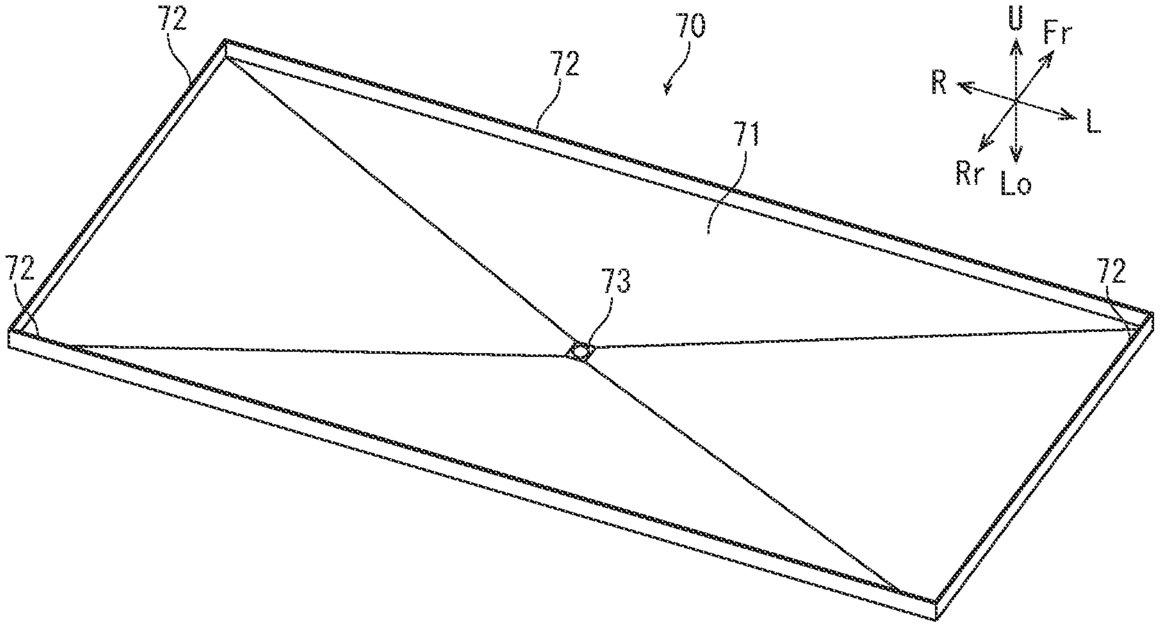
FIG. 10 is a perspective view showing a drip tray according to the embodiment of the present disclosure.
Figure 11:
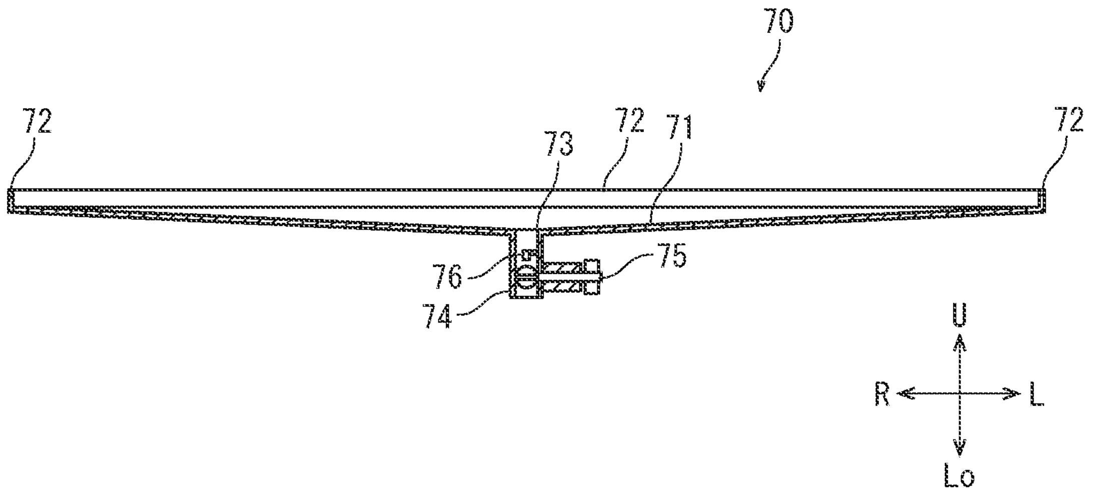
FIG. 11 is a sectional view showing the drip tray according to the embodiment of the present disclosure.
Figure 12:
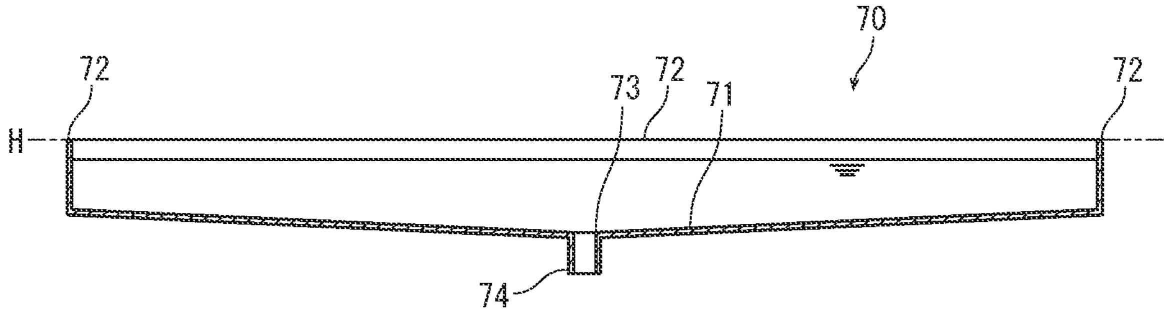
FIG. 12 is a sectional view showing the drip tray in which waste liquid is stored, according to the embodiment of the present disclosure.
Figure 13:
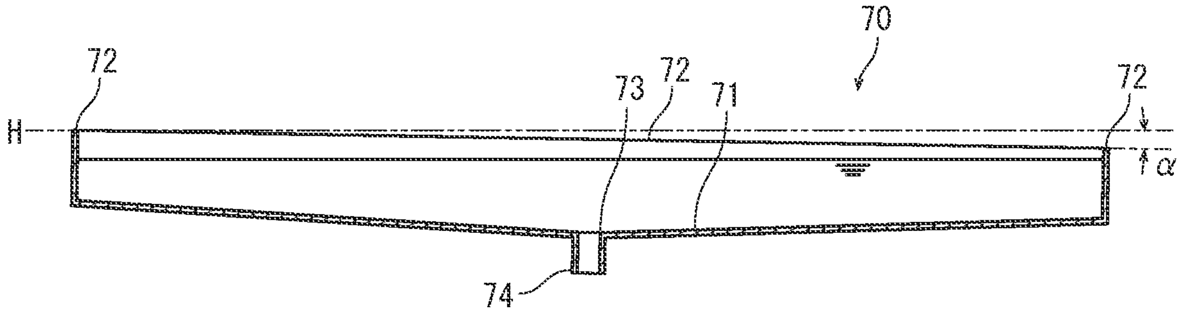
FIG. 13 is a sectional view showing the tilted drip tray according to the embodiment of the present disclosure.

[Drip Tray] Next, a drip tray 70 will be described (see FIG. 8 to FIG. 13). FIG. 10 is a perspective view showing the drip tray 70. FIG. 11 is a sectional view showing the drip tray 70. FIG. 12 is a sectional view showing the drip tray 70 in which waste liquid is stored. FIG. 13 is a sectional view showing the inclined drip tray 70. The two-dotted line in FIG. 12 and FIG. 13 shows the horizontal line.

The ink supply device 140 according to the embodiment includes the attachment part 50 to which the ink pack 35 is attached, and the drip tray 70 provided below the attachment part 50 and having a capacity of one or more of the ink packs 35. The attachment part 50 is described above. The drip tray 70 will be described hereinafter.

The drip tray 70 is provided below the attachment parts 50. The drip tray 70 has a size capable of containing all the ink packs 35 attached to the ink supply device 140 when viewed from the upper or lower side. For example, in the embodiment, since the four ink packs 35 are arranged in the left-and-right direction, the drip tray 70 has a size larger than the circumscribed rectangle including the four ink packs 35 when viewed from the upper or lower side. Therefore, the shape of the drip tray 70 of the embodiment has a rectangle shape whose longitudinal direction is along the left-and-right direction, when viewed from the upper or lower side.

The drip tray 70 has a rectangular bottom part 71 whose longitudinal direction is along the left-and-right direction. Around all the outer circumferential edge of the bottom part 71, an upward standing side wall part 72 is provided. The bottom part 71 has a discharge port 73 penetrating in the upper-and-lower direction at the center portion in the front-and-rear direction and in the left-and-right direction. The upper surface of the bottom part 71 is inclined downward toward the discharge port 73. The discharge port 73 is connected to a cylindrical part 74 protruding downward from the lower surface of the bottom part 71. The cylindrical part 74 is provided with a valve 75 openable and closable manually.

If the ink pack 35 is applied with damage checked visually during the work of attaching the ink pack 35 to the attachment part 50, it is highly possible that the spare ink pack 35 is attached under the judgment of the operator and ink leakage is avoided. However, in the case of small damage that are difficult to be checked visually, it is conceivable that the operator may attach the ink pack 35 without noticing the damage. In this case, it is expected that the ink will ooze from the damage and the waste ink will be accumulated in the drip tray 70.

Therefore, the drip tray 70 is provided with a detection part 76 which detects the ink leakage. The detection part 76 is provided inside the cylindrical part 74, for example. The detection part 76 may be of any configuration, for example, a sensor that detects a change in resistance between electrodes. The detection part 76 outputs a detection signal indicating that the ink leakage is detected, to the control part 2 of the inkjet recording device 1. When the detection signal is received, the control part 2 executes the prescribed processing.

For example, the control part 2 generates an alarm sound from a speaker (not shown) to urge the replacement of the ink pack 35. When the user notices the alarm sound, the damaged ink pack 35 is removed and stored in a plastic bag or the like, and the spare ink pack 35 is installed. However, it is conceivable that it is difficult to check the damaged ink pack 35. Therefore, the control part 2 may be configured to report the ink leakage to a service center via a communication line. Upon receiving the report, a service center attendant is dispatched to replace the ink pack 35. The ink leaked from the ink pack 35 falls on the drip tray 70. The waste ink accumulated in the drip tray 70 is collected by holding a container (not shown) below the discharge port 73 and then opening the valve 75.

Now consider a case where the ink leakage is no longer detected due to the failure of the detection part 76. If one of the four ink packs 35 is damaged, the ink of at most one of the ink packs 35 may leak. Therefore, the drip tray 70 according to this embodiment has a capacity equal to or greater than that of the ink pack 35. FIG. 12 shows a state in which the waste ink is stored in the drip tray 70 in the normal state, that is, in the horizontal state. Needless to say, the drip tray 70 in the horizontal state has the upper edges of the four side wall parts 72 at equal height, and the difference in height between the upper edges of the side wall part 72 and the liquid level of the waste ink is constant over the entire circumference.

Now assume that the drip tray 70 is tilted (see FIG. 13). For example, it is conceivable that the ink supply device 140 may tilt due to an impact of an object, an earthquake or the like or a member supporting the drip tray 70 may break, causing the drip tray 70 to tilt. When the drip tray 70 is tilted, the difference in height between the upper edge of the lowered side wall part 72 and the liquid level narrows, increasing the possibility of ink leakage. Therefore, it is desirable that the drip tray 70 has a depth that does not allow the ink of one of the ink packs 35 to overflow even when the drip tray 70 is tilted by a predetermined angle $\alpha$. The predetermined angle $\alpha$ is, for example, 1 degree.

The ink supply device 140 according to the present embodiment described above includes the attachment part 50 to which the ink pack 35 is attached and the drip tray 70 provided below the attachment part 50 and having a capacity equal to or greater than one of the ink packs 35. If one of the ink packs 35 is damaged, all of the ink of one of the ink packs 35 may leak. According to this embodiment, even if all of the ink of one ink pack 35 may leak, the leaked ink is stored in the drip tray 70, so that the ink leaked from the ink pack 35 can be prevented from flowing out of the ink supply device 140.

In addition, according to the ink supply device 140 according to the present embodiment, the drip tray 70 has a depth that does not allow the ink of one of the ink packs 35 to overflow even when the drip tray is tilted by 1 degree. With this configuration, even when the drip tray 70 is tilted by 1 degree, the ink can be prevented from flowing out.

In addition, according to the ink supply device 140 according to the present embodiment, the drip tray 70 has the discharge port 73 through which the ink is discharged. When the discharge port 73 is not provided, in order to recover the ink, the work of sucking the ink from the drip tray 70 by using a pump (not shown), for example, is required. But, according to this embodiment, the ink can be easily recovered by discharging the ink from the discharge port 73 into a container (not shown).

In addition, the image forming system 100 according to the present embodiment includes the ink supply device 140, the detection part 76 which detects the ink dropped on the drip tray 70, and the control part 2 which executes a prescribed process when the detection part 76 detects the ink. With this configuration, the ink leakage can be quickly treated.

The above embodiment may be modified as follows.

In the above embodiment, an example is shown in which the drip tray 70 is formed in a rectangle shape larger than the circumscribed rectangle including the four ink packs 35, but the drip tray 70 may have any shape as long as it has a size including all the ink packs 35.

In the above example, the discharge port 73 is provided at the center of the bottom part 71 in the front-and-rear direction and in the left-and-right direction, but the discharge port 73 may be provided at a different position from the center of the bottom part 71. For example, the discharge port 73 may be provided closer to the openable exterior plate 32 of the exterior plates 32 of the housing 30.

The invention claimed is:

1. An image forming system comprising:

an ink supply device including an attachment part to which an ink pack is attached and a drip tray provided below the attachment part and having a capacity equal to or larger than a capacity of one ink pack;

a detection part which detects the ink dropped on the drip tray; and a control part which executes a predetermined processing when the detection part detects the ink, wherein the drip tray has a discharge port through which the ink is discharged, the ink supply device includes a cylindrical part connected to the discharge port, and the detection part is provided in the cylindrical part.

2. The image forming system according to claim 1, wherein the drip tray has a depth that does not allow ink of one of the ink packs to overflow even when the drip tray is tilted by 1 degree.

3. The image forming system according to claim 1, wherein the drip tray has a bottom part provided with the discharge port and a side wall part upward standing around all the circumference of the bottom part, and the bottom part is inclined downward toward the discharge port.

* * * * *